(12) United States Patent
Fussnegger et al.

(10) Patent No.: US 6,291,792 B1
(45) Date of Patent: Sep. 18, 2001

(54) WELDED JOINT BETWEEN A SHEET-STEEL COMPONENT AND A LIGHT SHEET METAL COMPONENT, AND A WELDING METHOD

(75) Inventors: Wolfgang Fussnegger, Rohrau; Harald Brinkschroeder, Nebringen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 1461 days.

(21) Appl. No.: 08/552,174

(22) Filed: Nov. 2, 1995

Related U.S. Application Data

(63) Continuation of application No. 08/162,398, filed on Dec. 6, 1993.

(30) Foreign Application Priority Data

Dec. 4, 1992 (DE) .................................................. 42 40 823

(51) Int. Cl.[7] ............................. B23K 11/11; B23K 11/20
(52) U.S. Cl. ........................................... 219/118; 219/86.1
(58) Field of Search ................................... 219/94, 117.1, 219/118; 29/446, 512; 228/139, 262.44; 156/91

(56) References Cited

U.S. PATENT DOCUMENTS

| | | | |
|---|---|---|---|
| 2,620,539 | * 12/1952 | Poupitch | ................................. 29/446 |
| 2,819,925 | * 1/1958 | Wilfert et al. | . |
| 3,512,224 | * 5/1970 | Newton | ................................. 29/512 |
| 3,711,347 | * 1/1973 | Wagner et al. | ........................ 156/91 |
| 4,727,232 | * 2/1988 | Omori et al. | ........................ 219/118 |
| 4,791,765 | * 12/1988 | Noggle | ................................. 219/86.1 |
| 4,855,562 | 8/1989 | Hinden | . |

FOREIGN PATENT DOCUMENTS

| | | |
|---|---|---|
| 2639003 | 10/1989 | (FR) . |
| 1528730 | 10/1978 | (GB) . |
| 1201495 | 8/1989 | (JP) . |

* cited by examiner

Primary Examiner—Joseph Pelham
(74) Attorney, Agent, or Firm—Crowell & Moring LLP

(57) ABSTRACT

A welded joint is made between a sheet-steel component and a sheet-aluminum component by way of a lap or web weld. Hat-like clip parts are pushed through openings in the sheet-aluminum component. The clip parts are welded at their bottom to the sheet-steel component and overlap the exposed flat side of the sheet-aluminum component with their flanges, which form the free rims. In order to improve the quality of the weld, an adhesive is introduced into a gap situated between the clip part and the sheet-aluminum component.

10 Claims, 2 Drawing Sheets

WELDED JOINT BETWEEN A SHEET-STEEL COMPONENT AND A LIGHT SHEET METAL COMPONENT, AND A WELDING METHOD

This application is a continuation of application Ser. No. 08/162,398, filed on Dec. 6, 1993.

BACKGROUND AND SUMMARY OF THE INVENTION

The present invention relates to a lap- or web-welded joint between a sheet-steel component and a light sheet metal component, in particular a sheet-aluminum component, in which the components are welded together with at least one hat-like steel clip part, having a bottom region which projects to the sheet-steel component through an opening arranged in the light sheet metal component, and a flange forming free rim resting on a free flat side of the light sheet metal component. The present invention also relates to a method for welding the two components to one another in which method the light sheet metal component in a region of the overlap with the sheet-steel component with at least one opening, inserting a clip part into the opening such that the clip part overlaps an exposed flat side of the light sheet metal component with a flange thereof which forms a free rim, and welding the clip part at a bottom thereof projecting into the opening to the sheet-steel component by electric resistance welding.

German Patent 940,267 describes welding of overlapping body parts, in which one body part is a non-load-bearing aluminum panel and the other body part is a steel frame part. Openings are arranged in the panel in the region of the overlap. Hat-shaped clip parts are inserted into the openings and are manufactured from a material, such as steel, capable of being welded to the frame part. The flange of the clip part, which forms the free rim, rests against the free flat side of the panel, the side remote from the frame part, while the bottom of the clip part, which is arranged in the opening, is welded to the frame part. The cross-section of the clip parts is matched to the clear width of the holes.

To ensure that the hat-shaped clip parts inserted into the holes in the panel and matched in cross-section to the hole in the known method can hold the panel in a defined position, the clip parts and the holes must be produced precisely. However, this is associated with a lot of effort in production and with additional costs. Moreover, the joint between the frame part and the panel is sensitive to the vibrations which arise during the operation of a motor vehicle because these vibrations lead to fatigue in the material of the clip part because of the continuous stressing and to the clip part bending at its flanks. This bending increases an already existing slight play between the clip part and the wall of the hole and, as a result, this joint loosens. Furthermore, because the joint between the panel and the frame part relies entirely on the elasticity of the steel clip part in the direction of the perpendicular to the surface of the overlap, the risk of this joint loosening increases further.

It is an object of the present invention to further improve the welded joint between the sheet-steel component and the sheet-aluminum component such that the joint is stronger and can be produced at lower cost which the overall workpiece can be produced with smaller tolerances following the joining process. A further object is to develop a method for welding the components to one another.

According to the present invention, the foregoing objects have been achieved, in the case of the component, by separating the clip parts, at least in certain areas, from the light sheet metal component by a gap and by arranging an adhesive, particularly a heat-activatable adhesive, in the gap. By way of the adhesive introduced into the gap, the two components are not only clamped in a direction perpendicular to the surface in the region of the overlap with one another but are additionally bonded. Moreover, the opening arranged in the sheet-aluminum component, and the clip part can be machined to wider tolerances, hence more cheaply, because the adhesive also joins the sheet-aluminum component and the sheet-steel component in a defined position parallel to the surface in the region of the overlap. It is particularly advantageous) if a heat-actuatable adhesive is used and is actuated either by the heat supplied during the welding of the clip part to the sheet-steel component or, in the case of components which are subsequently to be coated, by the heat supplied for baking the coating.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
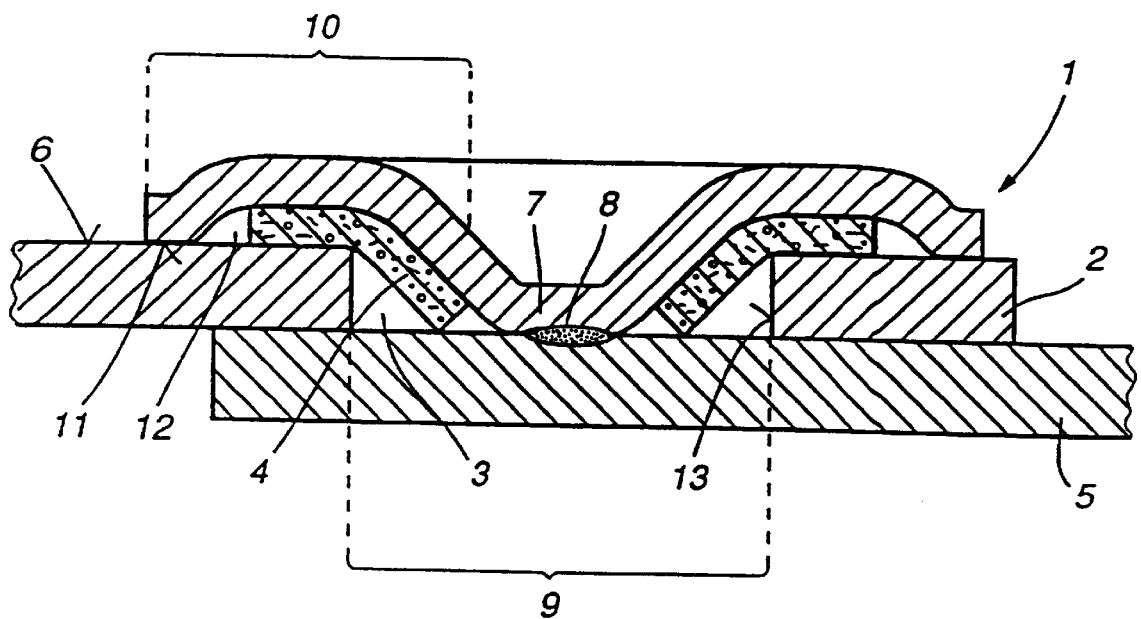
FIG. 1 is a cross-sectional view of a lap welded joint in accordance with the present invention.

The welded joint in FIG. 1 between a sheet-steel component 5 and a sheet-aluminum component 2 is formed by a lap weld 8 produced by electric resistance welding. In the region of the illustrated spot weld, the sheet-aluminum component 2 has openings 9 through which steel clip parts 1 of hat-like cross-section are inserted. The inserted clip parts 1 rest by their continuous front side, which forms the bottom 7 of the clip part 1, against the sheet-steel component 5. If there are a number of openings 9 participating in the welded joint in the sheet-aluminum component 2, it is advantageous to unite the associated clip parts 1 with a continuous strip of material since they can then be inserted easily and rapidly. On the free flat side 6 of the sheet-aluminum component 2, the flanges 10 of the clip parts 1 overlap the openings 9, the flanges 10 forming the free rims of the clip parts 1. The distance between the bottom 7 of the clip part 1 and the contact surface 11 of the flange 10 with the sheet-aluminum component 2 is advantageously equal to or less than the thickness of the aluminum sheet. As a result, when the bottom 7 of the clip part 1 is welded to the sheet-steel component 5 the contact surface 11 of the flange 10 of the clip part 1 advantageously rests under prestress against the free flat side 6 of the sheet-aluminum component 2. The flange 10 has an annular gap 12 which is arranged to the inside of the annular contact surface 11 and merges into a gap 3 arranged between the clip part 1 and the wall 13 of the opening 9. A prepreg web 4 is arranged in the free space consisting of the annular gap 12 and the gap 3 and is impregnated with an adhesive which additionally bonds all the components to one another adhesively. The method for the production of this welded joint is described below.

The sheet-aluminum component 2 is provided in the region of the subsequent lap weld 8 with openings 9 and placed against a sheet-steel component 5 so as to overlap it. The clip parts 1 of hat-shaped cross-section, which are provided on their side facing the sheet-aluminum component 2 with a prepreg web 4 impregnated with a heat-activatable adhesive, are inserted into the openings 9. The inserted clip parts 1 are then electric resistance-welded to the sheet-steel component 5 at their front-side bottoms 7 projecting into the opening 9. To increase the strength of the joint, the heat-activatable adhesive is heated and bonds the clip part 1 to the sheet-aluminum component 2 and to the sheet-steel component 5.

The adhesive is advantageously activated in one of the following ways. The heat-activatable adhesive can be activated by the heat supplied in the welding of the front-side bottom 7 of the clip part 1 to the sheet-steel component 5, in which case very little heat is supplied. It is also advantageous, if the workpiece welded together from the components is to be coated and the coating dried by heating, to activate the heat-activatable adhesive by the separate heating process already provided for the baking of the coating.

Figure 2:
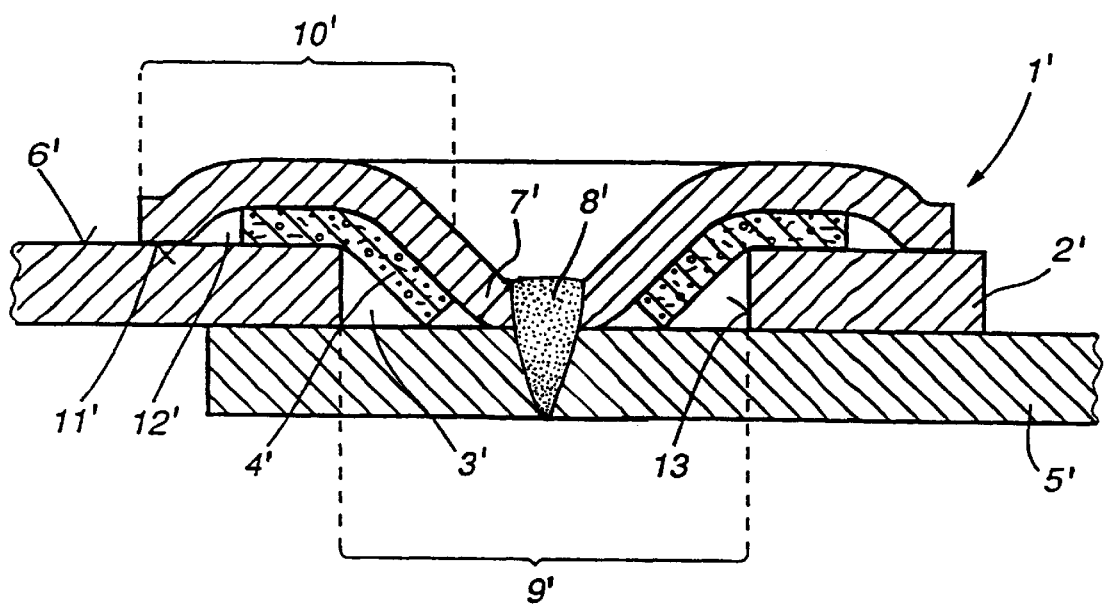
FIG. 2 is a cross-sectional view of a laser welded joint in accordance with the present invention.

In FIG. 2, the parts similar to the parts in FIG. 1 are designated by the same numeral but with a prime, and the laser weld is designated by the numeral 8'. Consequently, the foregoing description of the construction of the welded joint is essentially the same with regard to the laser welded joint and need not be repeated again, except to note that conventional laser welding is used rather than electric resistance welding.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A welded joint between a sheet-steel component and a light sheet metal component, the two components being welded together with at least one steel clip part having a hat-like shape defined by a central portion having a bottom region which projects to the sheet-steel component through an opening arranged in the light sheet metal component, a flange configured with a free rim resting on a free flat side of the light sheet metal component and portions between the central portion and the flange raised relative to the central portion and the free rim such that opposite sides of the light sheet metal component directly contact the free rim and the sheet-steel component and a gap is defined directly underneath an area of the raised portions which face the light sheet metal component such that an outer edge of the free rim is prestressed directly against the light sheet metal component in a state when the bottom region has been joined to the sheet steel component with the gap remaining, and an adhesive arranged in the gap to adhesively bond the sheet steel component and the light sheet metal component together.

2. The welded joint according to claim 1, wherein the adhesive is a heat-activatable adhesive impregnated in a fabric web.

3. The welded joint according to claim 1, wherein the adhesive is a heat-activatable adhesive having an activation temperature lower than the temperature of the clip part in the region of the adhesive while being welded to the sheet-steel component.

4. The welded joint according to claim 1, wherein the gap also occupies a region of the rim of the clip part overlapping the light sheet metal component on a free flat side thereof.

5. The welded joint according to claim 1, wherein the clip parts are electric resistance-welded to the sheet steel component.

6. The welded joint according to claim 1, wherein the clip parts are laser-beam welded to the sheet steel component.

7. A method for welding a sheet-steel component to a light sheet metal component by a weld produced by electric resistance welding, comprising the steps of providing the light sheet metal component with an opening in a region of the overlap with the sheet-steel component, inserting into the opening a hat-shaded clip part having a central portion with a bottom portion configured toward the sheet-steel component through the opening arranged in the light sheet metal component, a flange forming a free rim portion facing the light sheet metal part and offset portions between the free rim and the central portion to define a gap between the offset portions and the light sheet metal part such that the clip part overlaps an exposed flat side of the light sheet metal component, welding the bottom portion of the clip part to the sheet-steel component by electric resistance welding, thereby prestressing an outer edge of the free rim portion directly against the light sheet metal part and compensating play due to the offset portions which define the gap between the clip part and the light sheet metal component after the free rim portion is prestressed against the light sheet metal part, which gap includes the space between the free rim portion and the light sheet-metal part, by an adhesive introduced into said gap such that the sheet steel component and the light sheet metal component are adhesively bonded together.

8. The method according to claim 7, wherein the adhesive is a heat-activatable adhesive activated by heat supplied during the welding of the bottom of the clip part to the sheet-steel component.

9. The method according to claim 7, wherein the adhesive is a heat activatable adhesive activated by a separate heating up of one of the welded joint and the welded workpiece.

10. The method according to claim 9, wherein the two components are coated after being joined, and the coating is dried by heating, and the separate heating up is a coating baking process.

* * * * *